March 4, 1952    C. A. P. THOMAS    2,587,925
POWER-OPERATED REGISTER RESETTING MECHANISM
FOR GASOLINE DISPENSING PUMPS
Filed Jan. 12, 1949      3 Sheets-Sheet 2
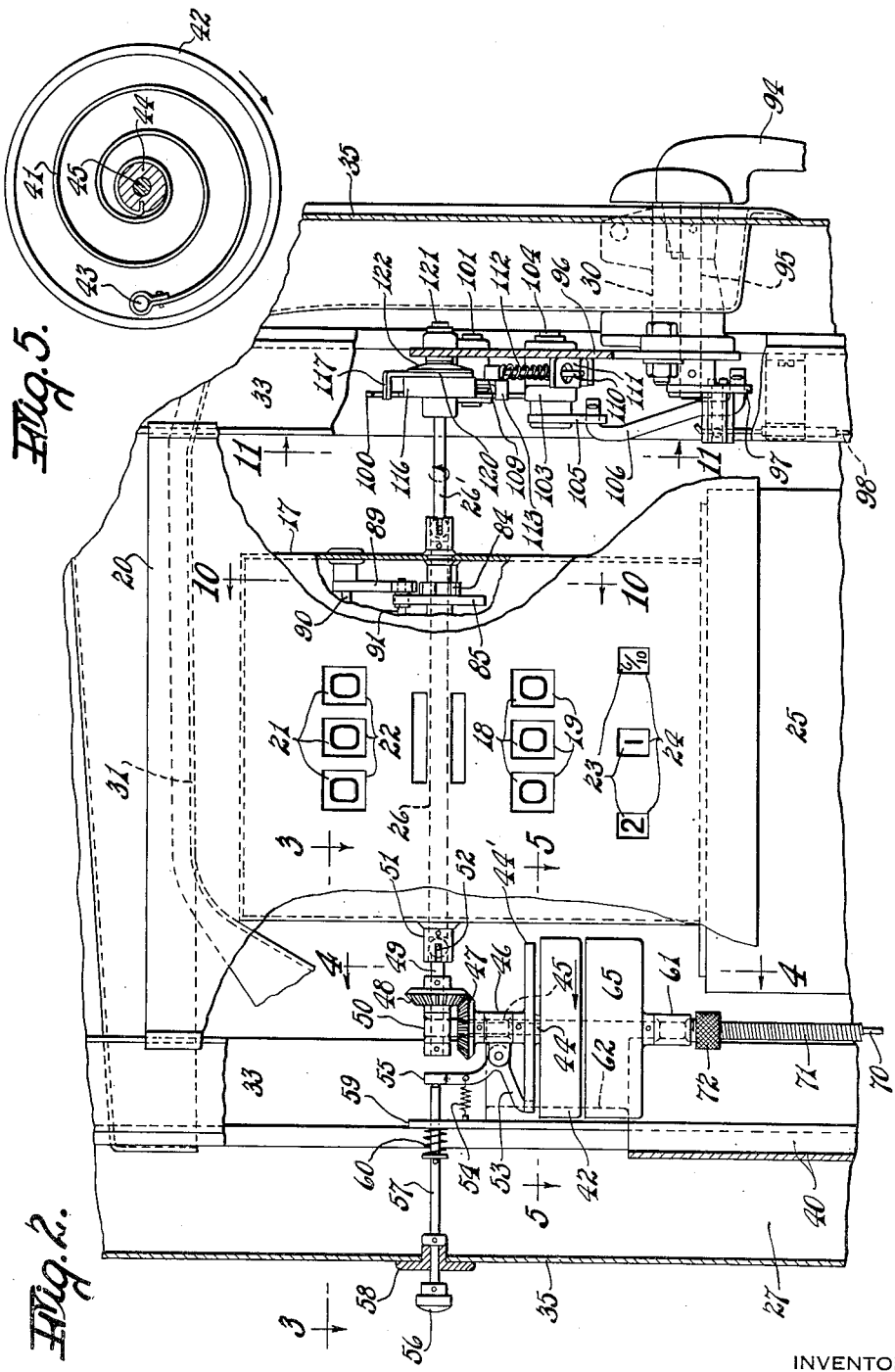
INVENTOR
CECIL A. P. THOMAS
BY Chapin & Neal
ATTORNEYS March 4, 1952
C. A. P. THOMAS
2,587,925
POWER-OPERATED REGISTER RESETTING MECHANISM
FOR GASOLINE DISPENSING PUMPS
Filed Jan. 12, 1949
3 Sheets-Sheet 3
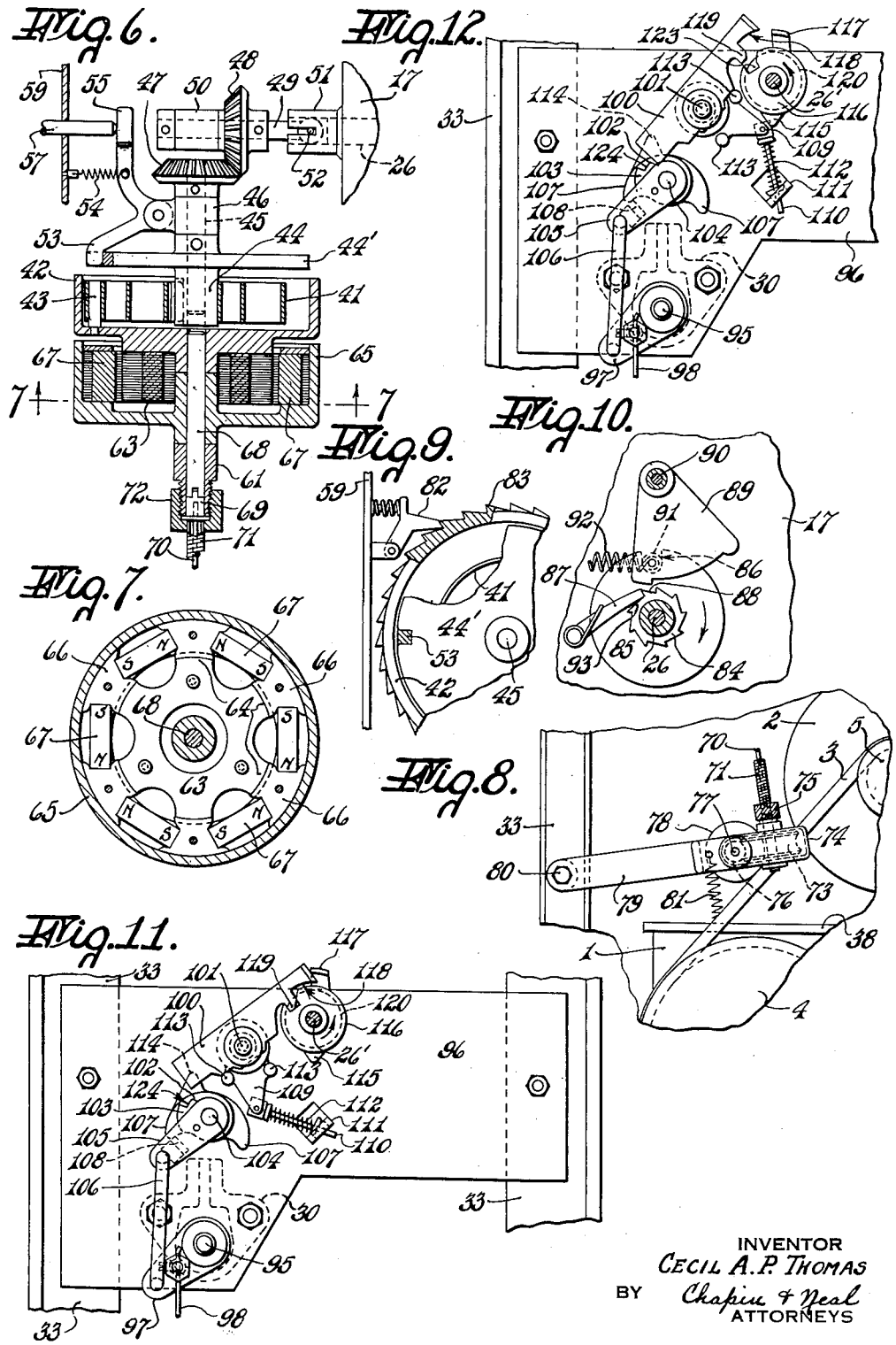
INVENTOR
CECIL A. P. THOMAS
BY Chapin & Neal
ATTORNEYS Patented Mar. 4, 1952

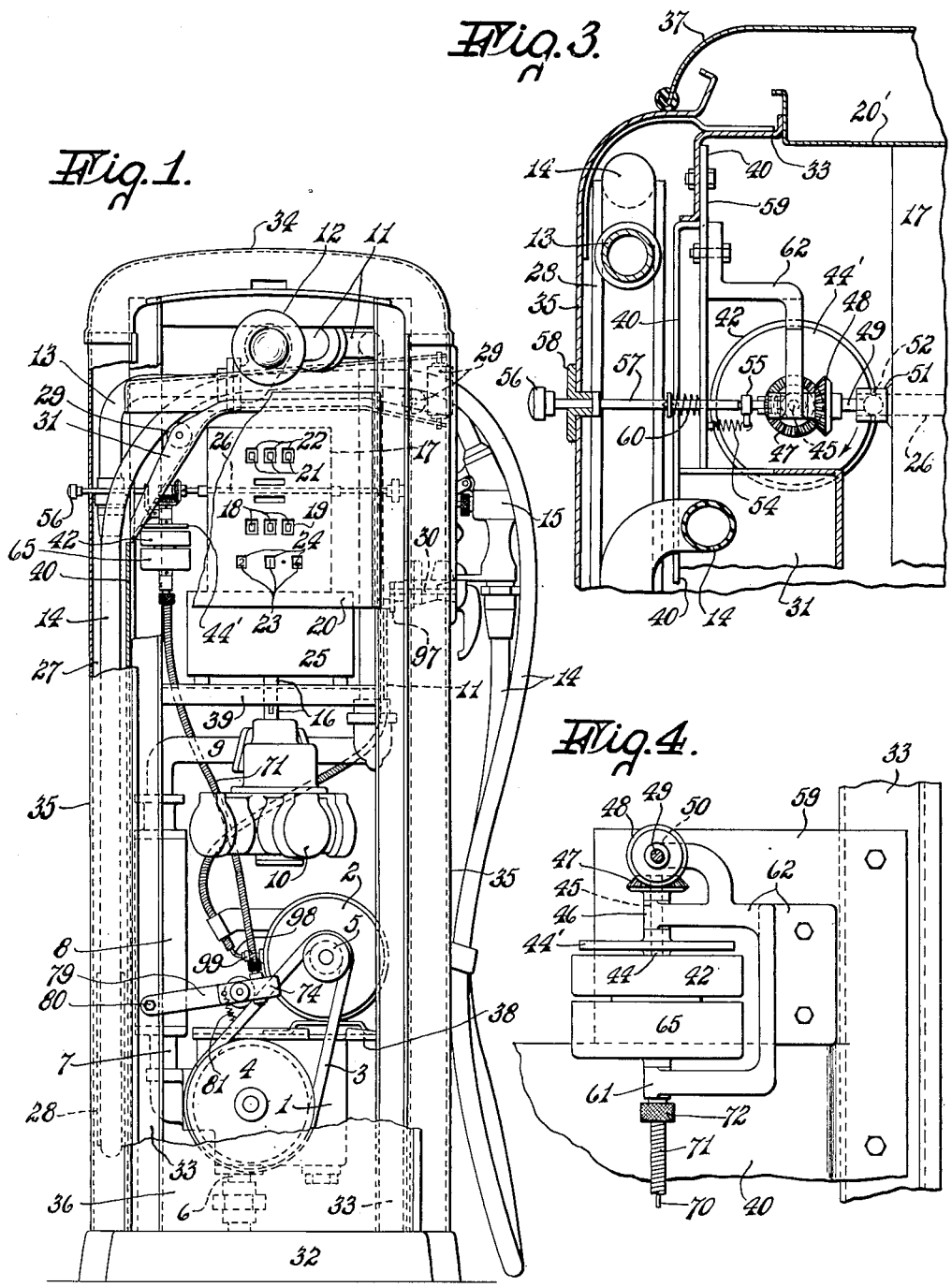

2,587,925

UNITED STATES PATENT OFFICE 2,587,925

POWER-OPERATED REGISTER RESETTING MECHANISM FOR GASOLINE DISPENSING PUMPS

Cecil A. P. Thomas, West Springfield, Mass., assignor to Gilbert & Barker Manufacturing Company, West Springfield, Mass., a corporation of Massachusetts Application January 12, 1949, Serial No. 70,468

4 Claims. (Cl. 222—34)

This invention relates to liquid measuring and dispensing apparatus, such as are adapted for use in service stations for dispensing measured quantities of gasoline.

Such apparatus commonly includes a register, usually of the number wheel type, which indicates the cost as well as the volume of the liquid dispensed and which is driven by a meter actuated by the pumped liquid. The register is provided with a shaft for resetting the number wheels to zero, when required. This shaft does not move with the number wheels during a dispensing operation but it is operable after a dispensing operation, when turned through a predetermined range, to reset all the number wheels to zero. The general practice heretofore is to turn this resetting shaft by hand.

This invention has for an object the provision of a power means, automatically operable when released, to turn the resetting shaft of the register through the range necessary to effect resetting of the number wheels to zero, and a transmission from pump motor of the liquid dispensing apparatus to the power means for storing power in the latter, such transmission including a slip type clutch, preferably of the magnetic type, which will slip after the needed amount of power has been stored in the power means, together with a means normally restraining the power means from actuating said shaft but manually releasable, whenever desirable, to enable the power means to act.

The invention will be disclosed with reference to one illustrative embodiment of it shown in the accompanying drawings, in which:

Fig. 1 is a front elevational view of a gasoline dispensing apparatus embodying the invention, most of the front panel having been broken away to reveal interior mechanism;

Fig. 2 is a fragmentary sectional elevational view, drawn to a larger scale and showing the register, the power means for resetting the register and the interlock mechanism preventing resetting during dispensing and vice versa;

Figs. 3, 4 and 5 are fragmentary sectional plan, cross sectional and sectional plan views taken on the lines 3—3, 4—4, and 5—5 respectively, of Fig. 2 and showing the power means for resetting the register;

Fig. 6 is a sectional elevational view of the power means for resetting the register;

Fig. 7 is a sectional plan view taken on the line 7—7 of Fig. 6 and showing the magnetic clutch;

Fig. 8 is a fragmentary front elevational view illustrative of part of the rotary transmission from the pump motor to the power means for resetting the register;

Fig. 9 is a fragmentary sectional plan view illustrative of a modification in detail;

Figs. 10 and 11 are cross sectional views taken on the lines 10—10 and 11—11 of Fig. 2; and Fig. 12 is a view taken similarly to Fig. 11 but showing the motor control locked prior to resetting the register.

Referring to these drawings, there is shown in Fig. 1 by way of illustrative example, one form of gasoline dispensing apparatus in which the invention may be embodied. A pump 1, driven by an electric motor 2, as by the belt 3 and pulleys 4 and 5, draws up gasoline from an underground storage tank (not shown) through a suction pipe 6 and forces it through a pipe 7, an air separator 8, and a pipe 9 into a meter 10 and thence by a pipe 11, a visible discharge indicator 12 and a pipe 13 into a flexible delivery hose 14, having on its discharge end a valved hose nozzle 15. The meter 10, which is of the positive displacement type, drives by means of a shaft 16, a registering mechanism which is contained in a casing 17. This registering mechanism may include a set of three number wheels 18 indicating gallons and having their indications visible through windows 19 in the dial plate 20, a set of three number wheels 21 indicating cost and having their indications visible through the windows 22, and a set of number wheels 23, indicating the price per gallon and having their indications visible through windows 24. Beneath the casing 17 is a casing 25, containing a variable speed transmission to drive the cost number wheels 21 in proper relation to the gallons number wheels 18 in order to show the cost of the gasoline dispensed computed at the unit price displayed by the number wheels 23. The register has a resetting shaft 26 (Fig. 2), operable when turned through a certain angular range, to reset the number wheels 18 and 21 to zero.

The dispensing apparatus shown is of the extensible hose type. Starting from the discharge end of pipe 13 in Fig. 1, the hose 14 extends downwardly into a well 27, around a weighted sheave 28, thence upwardly out of well 27, thence across the pump casing guided by rolls 29, and then out of the casing where it hangs in a loop with the nozzle 15 normally hung up on a fixed support 30. A trough 31 underlies the hose 14 where it crosses the casing. The arrangement is substantially like that shown in Hope Patent No. 2,242,749, dated May 20, 1941, to which reference is made for a more complete disclosure if necessary or desired.

The apparatus described is supported from a framework comprising a base 32, four angle iron columns 33, which are fixed to the base and upstand therefrom, and a dome 34, which surmounts the four columns and ties them together at their upper ends. The space between the base and dome is enclosed by four panels. There are two side panels 35 each of which is fixed to the adjacent pair of angle irons and there are front and rear panels 36 and 37, respectively, which are suitably mounted for convenient removal. The front panel is for the most part removed in Fig. 1 to show the interior mechanism. The motor 2 and pump 1 are fixed to a shelf 38, suitably fixed to columns 33, and the register casings 17 and 25 are supported by a similar shelf 39, similarly fixed to the columns. The described well 27 is formed between the left hand side panel 35 and a plate 40 fixed to and extending between the two adjacent columns 33 and extending upwardly from the base 32 to the left hand end of the trough 31.

The power means for actuating the resetting shaft consists of a spiral spring 41, contained within a drum 42 (Fig. 5). One end of this spring is fixed to a pin 43 in the drum and the other end is fixed to hub 44. This hub, as best shown in Fig. 6 is part of a disk 44', which is fixed to a short vertical shaft 45, rotatably mounted in a bearing 46. Fixed to the upper end of this shaft is a bevel gear 47 which meshes with a bevel gear 48 on a short horizontal shaft 49. The latter is rotatably mounted in a bearing 50 and its inner end is received in a socket 51, which is fixed on one end of the resetting shaft 26, and connected to drive the socket by a pin 52 which fits into a slot in the socket. The disk 44' is restrained from turning by a detent 53 engaging in a notch in the disk (see also Fig. 9). This detent is pivoted to ears on the bearing 46 and is urged into engagement with the disk by a spring 54 acting on an upward extension 55 of the detent. The detent may be released from the notch by pressing inwardly on a button 56 which is conveniently located outside the casing 35 and fixed to a rod 57, the inner end of which is engageable with extension 55 to release the detent 53. This rod 57 (Fig. 2) is slidably mounted in a bearing 58 on casing 35 and also in a plate 59, which is fixed as shown in Fig. 4 to one of the columns 33. A spring 60 normally holds rod 57 retracted in the position shown in Fig. 2. The bearings 46 and 50 as well as another bearing 61 (to be later referred to) are parts of a bracket 62 (Fig. 4), fixed as indicated to plate 59.

For winding up the spring 41 while the latter is restrained from turning the resetting shaft 26 by the detent 53, a rotary transmission is provided from the motor 2 which drives the pump. This transmission is indicated in its entirety in Fig. 1 and the driving and driven ends thereof are shown in detail in Figs. 8 and 6 respectively. The transmission includes a slip type clutch which is preferably of the magnetic type, enabling the driving element to slip relatively to the driven element without causing wear of the elements. As shown in Fig. 6, the drum 42, which contains the resetting spring 41 has fixed to its lower face a laminated iron member 63. This member as shown in Fig. 7 has on its outer periphery a circular series of angular spaced pole pieces 64. The member 63 fits within a drum 65 of non-magnetic material to which are fixed a circular series of laminated pole shoes 66, corresponding in number and spacing to the pole pieces 64. Each pair of pole shoes 66 is interconnected by a permanent bar magnet 67. The arrangement is such that alternate pole shoes 66 in the series are of opposite polarity. This drum 65, as shown in Fig. 6, is fixed to a vertical shaft 68 which is rotatably mounted in the described bearing 61. The upper end of shaft 68 is piloted in a hole in the magnetic rotor 63. The lower end of shaft 68 is connected by the coupling 69 to one end of a flexible shaft 70, which is housed in a sheath 71, connected by the coupling 72 to the threaded lower end of bearing 61. The other end of shaft 70 (Fig. 8) is connected to be driven by a worm gear 73, housed in a casing 74 to which the sheath 71 is connected by a coupling 75. In mesh with gear 73 is a worm 76 fixed to a shaft 77 which is mounted in casing 74 and extends outside the latter carrying a pulley 78. The casing 74 is fixed to an arm 79 pivoted at 80 to one of the columns 33. The pulley 78 is pressed against belt 3 by a spring 81 which connects arm 79 to shelf 38.

It will be clear that when the motor 2 is started, the flexible shaft 70 will drive drum 65 and the latter by magnetic attraction will drive the member 63 and thus drum 42. Since disk 44' is then held stationary by detent 53, the spring 41 will be wound up. The winding continues until sufficient power is stored in spring 41 for the resetting function. After the spring has been stressed so that the torsional force on member 63 tending to turn it backward is exceeded by the torsional force due to the magnets and tending to turn member 63 forward, the drum 65 will turn without turning member 63. The spring 41 will be wound up in the first few seconds of operation of motor 2 and thereafter the magnetic clutch will slip until the motor 2 is stopped. Magnetic attraction between the clutch members will hold the spring 41 from unwinding. The rotor of pump 1 will not be able to turn since the entire dispensing conduit is filled with liquid. Thus, the belt 3 and the rotor of motor 2 will be held stationary and therefore shaft 70 and drum 65 will be held stationary. If necessary, a holding pawl, such as 82 in Fig. 9, pivoted to plate 59, could engage a ratchet 83 on drum 42 and positively prevent reverse rotation of this drum and the unwinding of spring 41.

Before describing the resetting operation, it is necessary to consider certain provisions in the register and in the customary interlock between the resetting shaft and the controlling means for motor 2, both the provisions and the interlock affecting the resetting operation.

The particular register shown is the same as that disclosed in the DeLancey Patent No. 2,390,239, dated December 4, 1945. The well known Veeder-Root computing register may equally well be used. Both include the same general arrangement, whereby the resetting shaft is turned forwardly 405° to effect resetting and is then turned backwardly 45°, making a net movement of 360° or one revolution of shaft 26. Referring to Fig. 10, shaft 26 has fixed thereon within the housing 17 a ratchet 84 and a disk 85 having a single radial notch 86 therein. A spring pressed pawl 87 cooperates with ratchet 84 and is normally engaged with ratchet tooth 88. A member 89 is pivoted to a shaft 90 and carries near its lower end a roll 91 adapted to engage in notch 86. A spring 92, connecting member 89 to a stationary part (not shown) of the register, tends to turn member 89 clockwise and through roll 91 to turn disk 85 counterclockwise but cannot do so because of the engagement of pawl 87 with ratchet tooth 88. The resetting shaft 26 is thus held against reverse rotation. To reset the register, shaft 26 is turned clockwise as viewed in Fig. 10. As the shaft is thus turned the first action is to move roll 91 to the right and stress spring 92. This action continues for 45° when roll 91 will have moved completely out of notch 86 and onto the periphery of disk 85, where it will not exert any force acting to turn the disk backward. During this 45° interval, the usual clutches (not shown) will be actuated to disconnect each set of number wheels from the driving mechanism and then connect them to the resetting shaft 26, all as disclosed in said DeLancey patent. The first tooth 93 of ratchet 84 is slightly more than 45°. One can therefore turn the shaft through the initial 45° movement and then move it backward to zero. However, after the resetting commences, which occurs just after the initial 45° movement of shaft 26 is completed, the shaft 26 cannot be restored to its initial position by reverse rotation because of the pawl 87 and ratchet 84. Shaft 26 can then only be turned forwardly or clockwise, wherefore resetting, once initiated, must be completed. After the shaft has turned 405°, the notch 86 will move under roll 91 and the latter will drop into the notch and the spring 92, acting through member 89 and roll 91, will turn disk 85 backwardly 45° into the position shown, the long tooth 93 permitting this reverse movement. Resetting will have been completed prior to this reverse movement of shaft 26. It will thus be seen that shaft 26, and thus the notched disk 44', always come to rest in the same positions. The spring 41 must be strong enough to turn shaft 26 the necessary 405° movement and overcome the force of spring 92. As the resetting movement is completed, spring 41 is nearly unwound and spring 92 can readily overpower it to cause the backward movement of the resetting means into initial position.

The motor 2 is controlled by a handle 94 (Fig. 2) located outside the pump casing and adjacent the outer end of the hose nozzle support 39. This handle is fixed to a shaft 95 mounted in the support 39 which is fixed to a plate 96, suitably fastened (Fig. 11) to certain of the columns 33. This shaft 95 extends inside the pump casing and has fixed to its inner end an arm 97 which is connected by a Bowden wire 98 to actuate a switch in the casing of motor 2. This switch has a rod 99 which is connected to the lower end of the Bowden wire and which when pulled outwardly (to the left as viewed in Fig. 1) will close the switch and start the motor. When rod is in the position shown in Fig. 1 the motor switch is open.

There is customarily provided an interlock between resetting shaft 26 and the switch control shaft 95. An example of one such interlock is shown in Figs. 11 and 12. These two views are taken from a direction opposite to that in which Fig. 10 is taken. Hence in Figs. 11 and 12 the direction of resetting is counterclockwise instead of clockwise as in Fig. 10. A latch 100 is pivoted on a stud 101 to plate 96 and is movable from one to the other of two extreme positions. In one position, shown in Fig. 12, latch 100 engages a shoulder 102 on a member 103, mounted to turn on a stud 104, fixed to plate 96. This member 103 and an arm 105 are pinned together, as indicated, and the arm 105 is connected by a link 106 to the lever 97, which operates the motor switch. Lugs 107 on a member 103 are engageable with a stop 108, fixed on plate 96, to limit the movement of the member. This member 103 is shown locked in "switch off" position with one lug 107 engaging the stop 108. When unlocked, in a manner to be described, the member 103 is free to turn until the other lug 107 engages the stop 108 and the member will then be in "switch on" position.

The latch 100 is moved from one to the other of its two extreme positions by toggle mechanism. A toggle link 109 is pivotally mounted at one end on a stud 101 to swing independently of latch 100 and at its other end is pivoted to one end of a second toggle link 110. The lower end of link 110 slides in a lug 111 on plate 96 and a spring 112 acts between this lug and a shoulder on the link. The toggle link 109 has pins 113 thereon which project outwardly in underlying relation with latch 100. When the toggle links are moved from one to the other of the two extreme positions illustrated, one or the other of these pins 113 will engage and move the latch 100. The toggle links are moved either by a cam 114 fixed to member 103 or by a cam 115 on a member 116, operated by the resetting shaft 26 through an extension 26'. Each of these cams will engage the adjacent pin 113 and move it and the toggle links far enough to cross the line of centers connecting the outer pivot points of the two toggle links, in this case, the center of stud 101 and the axis of the hole in lug 111. As shown, the cam 115 will, after the member 116 has been turned counterclockwise, say 280°, engage the upper pin 113 and swing the toggle link 109 in a clockwise direction until it crosses the aforesaid line of centers, whereupon the previously compressed spring 112 will expand and move the lower pin 113 against the latch 100 in position to move the latter to release the member 103 and allow the switch to open. But the release does not immediately occur because of the restraining action of a lug 117 which, shortly after the member 116 was started on its counterclockwise movement, moved in under a curved surface 118 on the under side of latch 100 and against a tooth 119 on the latch. This lug is carried by a disk 120, mounted to turn on the same stud 121, which rotatably supports the member 116. A spring disk 122 (Fig. 2) on stud 121 presses disk 120 against the back of member 116 so that the member frictionally drives disk 120 with it until the latter engages tooth 119. This disk 120 thus moves 45° counterclockwise and then comes to rest, preventing movement of latch 100 until the resetting shaft 26 has completed one full revolution and been released for the automatic 45° clockwise movement described. Such clockwise movement will cause disk 120 to be driven by member 116 to carry lug 117 out of engagement with latch 100, whereupon the latch will be moved to its other position with a snap action by the expanding toggle spring 112. In this other position, latch 100 will have moved away from shoulder 102 to release the motor switch for operation and the tooth 119 will have been moved into a notch 123 in member 116 to lock the resetting shaft against operation.

When the motor switch is turned on by moving lever 97 in a clockwise direction from the Fig. 11 position until the right hand lug 107 abuts stop 108, the cam 114 will engage the lower pin 113, which is then in contact with the lower edge of latch 100, and move the toggle link 109 in a counterclockwise direction until it crosses the line of centers of the toggle, after which the spring 112 will move the link still further in the same direction until the upper pin 113 engages the lower edge of latch 100. But the latch 100 cannot then move counterclockwise to withdraw tooth 119 from notch 123 and release the resetting shaft 26 for operation because the latch is restrained by its lower end resting on a surface 124 of member 103. Not until the motor switch is turned off is the latch released to be moved by the spring 112 far enough to withdraw tooth 119 from notch 123 and release the resetting shaft 26 for movement by the power means described.

The operation will be clear from the foregoing description and need be but briefly summarized. The normal condition is to leave the register showing the amount of the last sale and to reset the register just prior to the start of a dispensing operation. The spring 41 will have been wound up during the preceding dispensing operation and held wound up by the detent 53 until needed to cause resetting. The pump control handle 94 will be locked by latch 100, as shown in Fig. 12, and the tooth 119 will be withdrawn from notch 123 of member 116 so that the resetting shaft 26 will be free to turn whenever the detent 53 is moved to release disk 44'. When a dispensing operation is desired, the operator first presses in on button 56, thereby releasing the detent 53 from disk 44', whereupon the previously wound up spring 41 unwinds and turns shaft 26 through the 405° movement necessary to reset the number wheels to zero. This will occur almost instantly and it is assumed that the operator will hold the button 56 pressed inwardly until resetting has been completed. If he does not, then the detent will drop back in the notch in disk 44' after one complete revolution and interrupt the resetting operation. To complete this operation, the operator will be compelled to again press the button 56 inwardly to release disk 44' and enable the remaining 45° movement to be effected. At the end of the 405° movement, the spring 92 will turn shaft 26 backwardly 45° and this will move disk 44' back into position to be engaged and locked by detent 53. At the end of the 45° backward movement, the latch 100 will be released, allowing tooth 119 to enter notch 123 and lock member 116 and thus shaft 26 against movement. At the same time, latch 100 will be withdrawn from tooth 102, thereby enabling handle 94 to be turned to start motor 2. The interlock parts will then be in the relative positions shown in Fig. 11. The pump motor 2, being started, dispensing and measuring of the gasoline proceeds in the usual manner, the quantity and price being indicated on the number wheels 18 and 21, respectively. The initial operation of motor 2 acts through the transmission described to wind up spring 41 until sufficient power to effect the resetting operation has been stored in the spring 41, after which the driving clutch element 65, 66, 67 continues to move while the driven clutch element 63, 64, 42 remains stationary. The power means is thus conditioned for a succeeding resetting operation. At the completion of a dispensing operation, the handle 94 is turned to stop the motor 2 and this causes the interlock parts to assume the positions shown in Fig. 12, whereby the motor switch is locked in open position and the resetting shaft is unlocked by the withdrawal of tooth 119 from notch 123 in readiness for a subsequent resetting operation.

An alternative operation is possible if the detent 53 is removed as it may be by the withdrawal of its pivot pin. When the motor switch is closed, the resetting shaft 26 becomes locked by tooth 119, as shown in Fig. 11, and the spring 41 will be wound up as before described. Then, when the motor switch is opened to stop the pump motor, the tooth 119 will be moved to release shaft 26 and resetting will be effected by spring 41, as heretofore described. Usually, the preferred plan is to reset just prior to dispensing but, if and when automatic resetting is desired at the end of a dispensing operation, it can be had by the structure disclosed, by making the simple change described.

The structure disclosed is capable of use with other forms of registering mechanism, such as the pointer and dial type, for example. It has been disclosed herein merely in the form in which it is most likely to be used at the present time, since the computing type, number wheel form of registering mechanism is the one in general use today at gasoline service stations.

I claim:

1. In a liquid measuring and dispensing apparatus of the type having a dispensing conduit, a meter interposed in the conduit for measuring the liquid dispensed, a pump for forcing liquid through the conduit and meter, a motor for driving the pump, a control member for the motor movable from one position in which the motor is stopped to another position in which the motor operates, a register driven by the meter for indicating the amount of liquid dispensed and having a resetting shaft, an interlock between the control member and resetting shaft for holding the latter stationary while the control member is in its second-named position and for releasing the shaft when the control member is in its first-named position; a power means for actuating said shaft, releasable means operable independently of said interlock for restraining said power means from actuating said shaft, means for storing power in said power means while the latter is restrained by said restraining means, said power-storing means comprising a rotary transmission from the pump-driving motor to the power means and including a slip-type clutch operable to slip after a predetermined amount of power has been stored in said power means, and means for releasing said restraining means to allow the power means to turn said shaft while said motor is stopped and reset the register.

2. In a liquid measuring and dispensing apparatus of the type having a dispensing conduit, a meter interposed in the conduit for measuring the liquid dispensed, a pump for forcing liquid through the conduit and meter, a motor for driving the pump, a control member for the motor movable from one position in which the motor is stopped to another position in which the motor operates, a register driven by the meter for indicating the amount of liquid dispensed and having a resetting shaft, an interlock between the control member and resetting shaft for holding the latter stationary while the control member is in its second-named position and for releasing the shaft when the control member is in its first-named position; a power means for actuating said shaft, releasable means operable independently of said interlock for restraining said power means from actuating said shaft, means for storing power in said power means while the latter is restrained by said restraining means, said power-storing means comprising a rotary transmission from the pump-driving motor to the power means and including a magnetic clutch operable to slip after a predetermined amount of power has been stored in said power means, and means for releasing said restraining means to allow the power means to turn said shaft while said motor is stopped and reset the register.

3. In a liquid measuring and dispensing apparatus of the type having a dispensing conduit, a meter interposed in the conduit for measuring the liquid dispensed, a pump for forcing liquid through the conduit and meter, a motor for driving the pump, a control member for the motor movable from one position in which the motor is stopped to another position in which the motor operates, a register driven by the meter for indicating the amount of liquid dispensed and having a resetting shaft, an interlock between the control member and resetting shaft for holding the latter stationary while the control member is in its second-named position and for releasing the shaft when the control member is in its first-named position; a spring for turning said shaft, a latch for restraining said spring from turning said shaft, means for conditioning said spring to turn said shaft including a rotary transmission from the pump-driving motor to said spring and a slip-type clutch operable to slip after said spring has been conditioned to a predetermined degree, and manually-operable means for releasing said latch to allow the conditioned spring to turn said shaft while said motor is stopped and reset the register.

4. In a liquid measuring and dispensing apparatus of the type having a dispensing conduit, a meter interposed in the conduit for measuring the liquid dispensed, a pump for forcing liquid through the conduit and meter, a motor for driving the pump, a control member for the motor movable from one position in which the motor is stopped to another position in which the motor operates, a register driven by the meter for indicating the amount of liquid dispensed and having a resetting shaft, an interlock between the control member and resetting shaft for holding the latter stationary while the control member is in its second-named position and for releasing the shaft when the control member is in its first-named position; a spiral spring for turning said shaft, a latch restraining said shaft from being turned by said spring, means for winding up said spring while the latter is restrained by said latch, said spring-winding means comprising a slip-type clutch including driving and driven elements, the driven element being connected to said spring, and a rotary transmission from the pump-driving motor to said driving element, whereby when the motor starts the pump it winds up said spring to a predetermined extent when the driven element of the clutch stops, and manually-operable means for releasing said latch to enable the spring to unwind and turn said shaft while said motor is stopped and reset said register.

CECIL A. P. THOMAS.

REFERENCES CITED

The following references are of record in the file of this patent:

UNITED STATES PATENTS

| Number | Name | Date |
| --- | --- | --- |
| 1,685,481 | De Hart | Sept. 25, 1928 |
| 2,105,813 | Goss | Jan. 18, 1938 |